July 17, 1951      E. H. WENBERG      2,560,618

SOLAR NAVIGATING INSTRUMENT

Filed Jan. 19, 1949      3 Sheets-Sheet 1

Inventor
EDWIN H. WENBERG

Attorney

July 17, 1951     E. H. WENBERG     2,560,618
SOLAR NAVIGATING INSTRUMENT

Filed Jan. 19, 1949     3 Sheets-Sheet 2

Inventor
EDWIN H. WENBERG

By D. B. Snyder

Attorney

July 17, 1951 E. H. WENBERG 2,560,618
SOLAR NAVIGATING INSTRUMENT
Filed Jan. 19, 1949 3 Sheets-Sheet 3
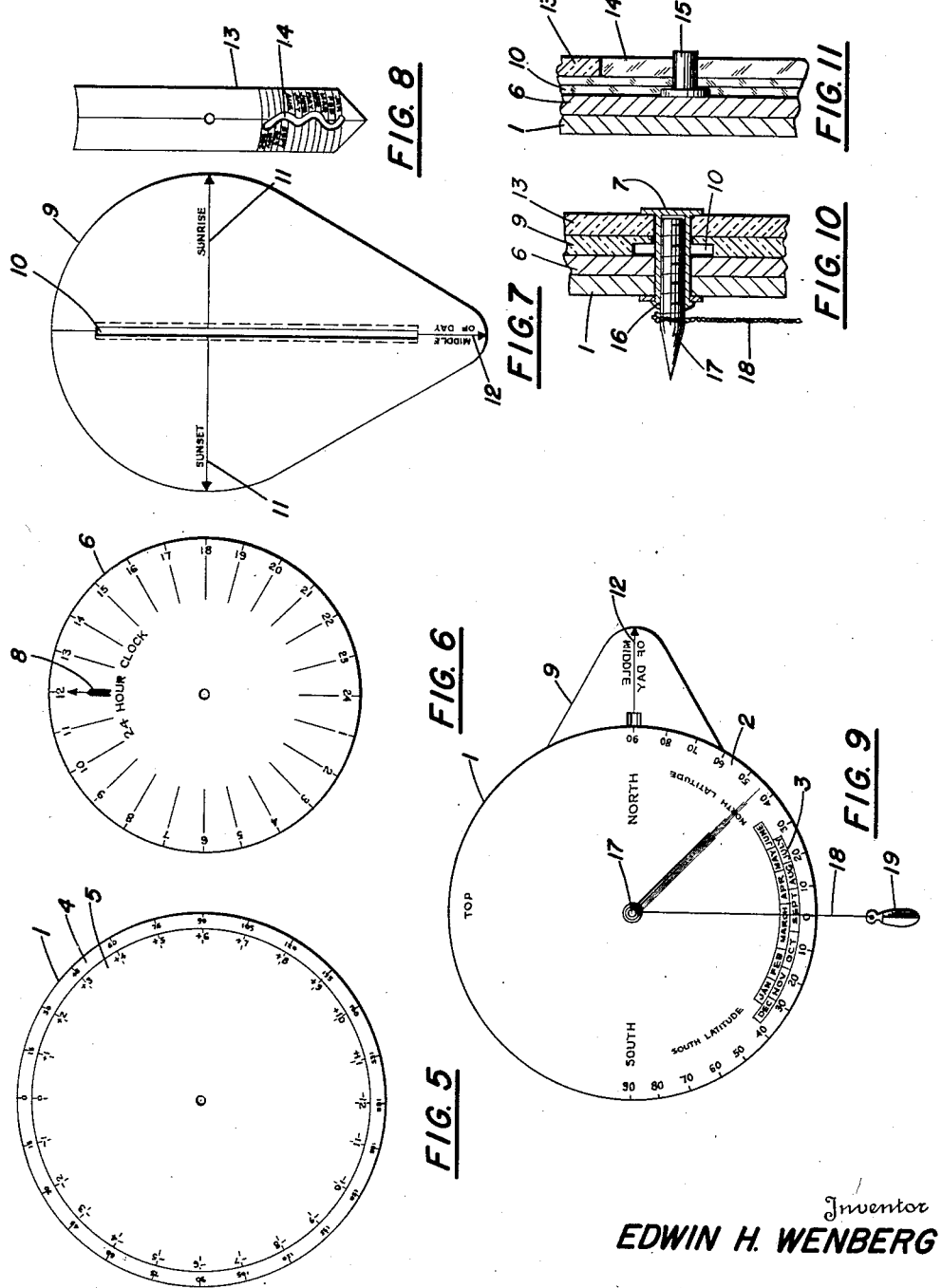
Inventor
EDWIN H. WENBERG
By D. E. Snyder
Attorney

Patented July 17, 1951

2,560,618

UNITED STATES PATENT OFFICE 2,560,618

SOLAR NAVIGATING INSTRUMENT

Edwin H. Wenberg, Caracas, Venezuela

Application January 19, 1949, Serial No. 71,742

3 Claims. (Cl. 235—61)

(Granted under the act of March 3, 1883, as amended April 30, 1928; 370 O. G. 757)

This invention relates to a navigation instrument and more particularly to an instrument for determining geographic position or location.

An object of the invention is to provide a navigational device with which it is possible to locate one's geographic position on a map.

Another object is to provide a navigational device with which an accurate course or direction of travel can be tracked as well as the determination of distance travelled.

A further object of the invention is to provide a device that is simple in construction, light and compact, and which can be used accurately by one not skilled in the art of navigation.

The invention will now be described with reference to the drawings, in which:

Figs. 5, 6, 7 and 8 show the parts in disassembly;

Fig. 9 shows elevation of reverse side of Fig. 1;

Fig. 10 is a cross section of a detail; and

Fig. 11 is a cross section of a detail.

Figure 1:
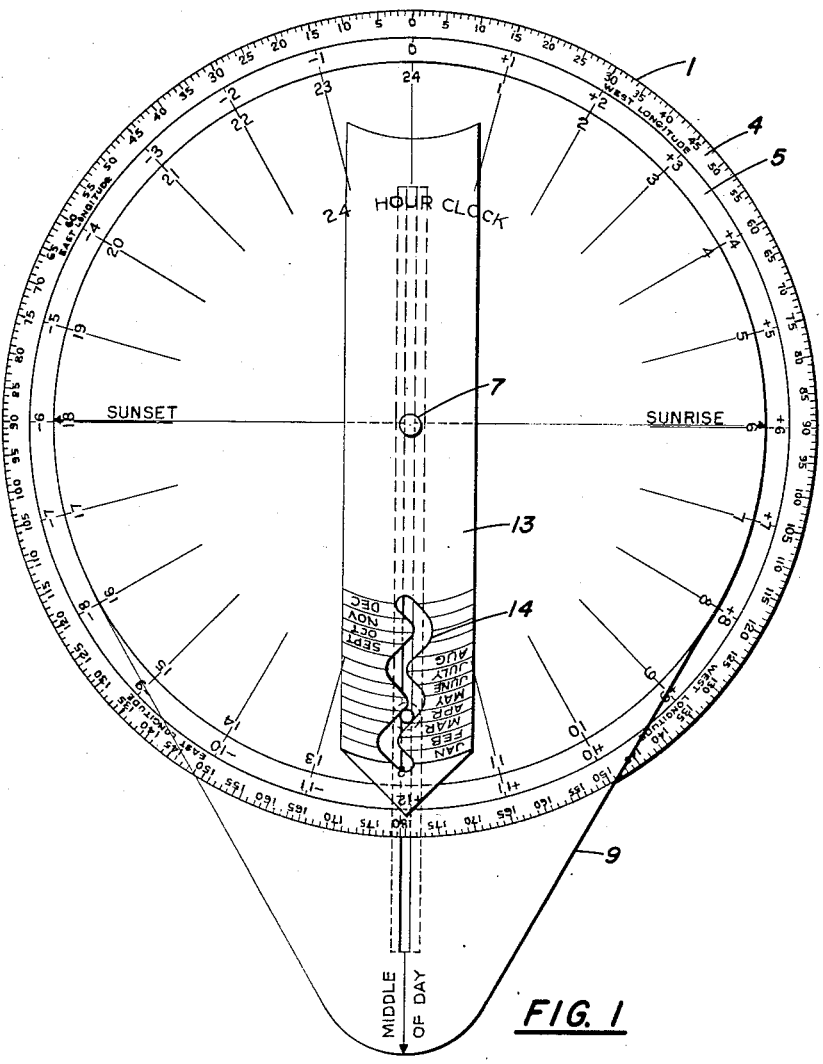
Fig. 1 is an elevation of the assembled device.
Figure 2:
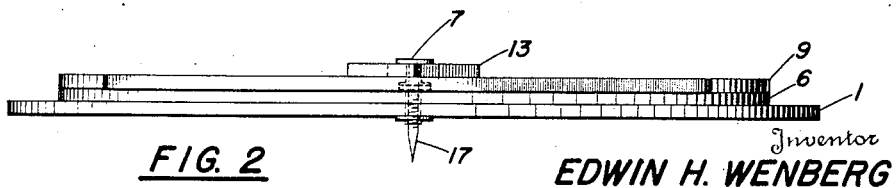
Fig. 2 is a side elevation.
Figure 4:
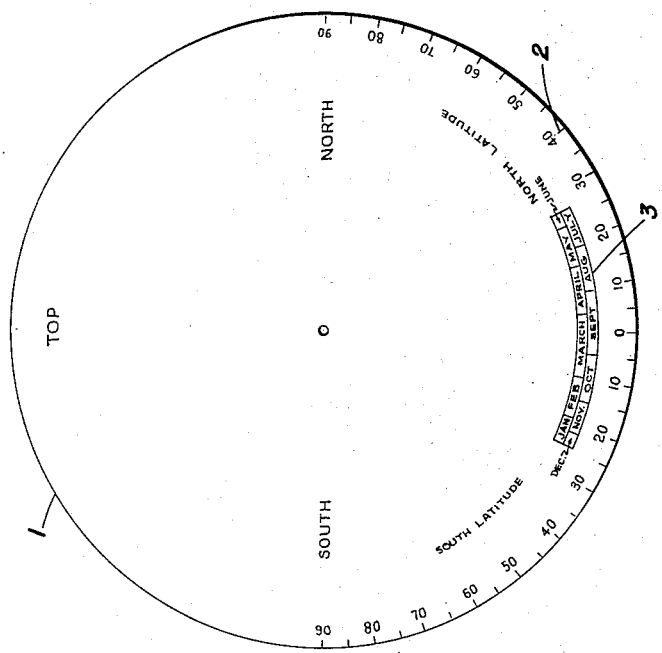
Fig. 4 is a plan view of the reverse side of Fig. 3.
Figure 3:
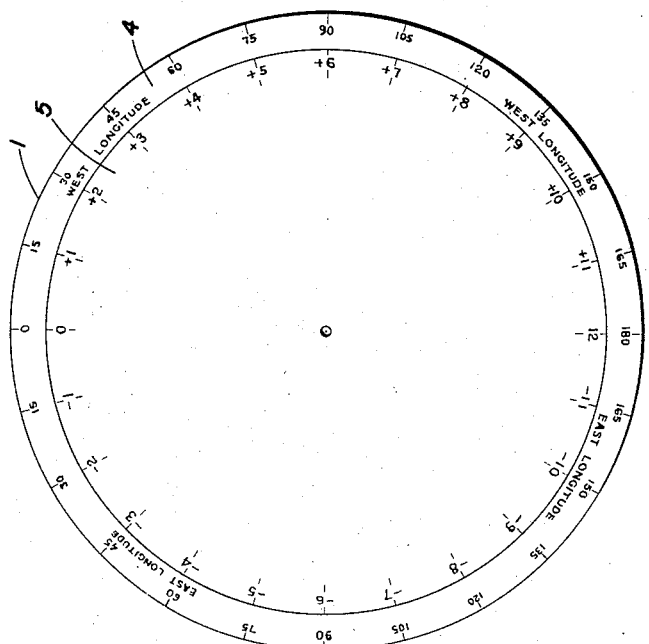
Fig. 3 is a plan view of a detail.

This navigational aid can be put to many practical uses, for example, as a part of life boat or life raft equipment to enable shipwreck survivors or downed aviators to chart their geographic position from day to day. It could also be used as an educational device or by sportsmen such as hunters, hikers, or small craft sailors.

The device comprises a disc 1 constructed of plastic or any other desirable material. On one side of the disc extending along the outer periphery is marked a scale 2, in degrees of latitude ranging from 0° to 90° in one direction to represent north latitude and in the opposite direction from 0° to 90° to represent south latitude. Centrally located inside the latitude scales are two rows of blocks 3, each block designating a successive month of the year. On the other side of the disc extending around its outer periphery is another scale 4, in degrees of longitude ranging from 0° to 180° in one direction for east longitude and from 0° to 180° in the opposite direction to designate west longitude. Inside of this scale is another scale 5 representing the various time zones. This scale ranges from plus 1 to plus 12 in one direction and minus 1 to minus 12 in the other direction, thus all the plus or minus time zones are represented.

A second disc 6 is pivotally mounted face to face on the first disc by means of a pivot pin 7. This second disc 6 is constructed desirably of the same material as is the first disc but is of smaller diameter, thus enabling the reading of the longitude and time group scales on the first disc. The disc 6 carries indicia around its outer periphery to represent a 24 hour clock dial having an arrow 8 located at the twelve o'clock position on the clock dial.

Adjacent the second disc is mounted a transparent tear drop shaped disc 9 conforming to the contour of the second disc at its larger end. This disc carries therein a longitudinal slot 10 running from near the small end centrally through the disc to near the large end. This slot receives the pivot pin 7 thus providing for longitudinal as well as pivotal movement of the transparent disc. On the face of the disc and running transverse the slot are two arrows 11, one representing sunrise and the other representing sunset. At the small end of the disc parallel to and intersecting the slot is another arrow 12 representing midday.

Pivotally mounted on the pivot pin 7 adjacent the transparent disc is a transparent pointer 13. This pointer is of sufficient length to extend substantially to the longitude scale 4 carried by the first disc. The pointer is positioned so that its point is in a plane substantially the same as the plane of the mid-day marking 12 on the same end of the transparent disc 9. Near the point end of the pointer there is a through slot 14 of sinuous form weaving from one side of the longitudinal center line of the pointer to the other. This slot 14 is determined in the following manner. A line is drawn on pointer 13 from pivot point 7 as far as an arrow 8 on disc 6 and its outer half divided into segments for the various months of the year. Through the center of each segment is swung an arc concentric to the disc and equal in degrees to the difference between mean sun time and observed sun time for the 15th day of the corresponding month. (This amount varies for different times of the year, and its magnitude may be found in charts or books on astronomical navigation.) The arcs are swung counter-clockwise from the radial line for April to June and October to December and clockwise for the rest of the year. A line connecting the extremities of these arcs forms the center of slot 14. Through this slot 14 and extending through the slot 10 in the transparent disc 9 is placed a floating rivet or pin 15 having its head portion positioned below the transparent disc thus acting as a retainer for the pin. Along the zig-zag slot 14 is marked the months of the year. By sliding the floating rivet 15 in the zig-sag slot the relative position of the pointer 13 with respect to the transparent disc 9 can be varied for any desired month, thus providing for corrections for differences between sun time and mean sun time.

On the reverse side of the instrument on which is located the latitude scale 2, previously described, is a socket 16. This socket is preferably formed in the end of the pivot pin 7 and is so adapted to receive a shadow casting needle or pin 17. The needle has affixed thereto a length of thread 18 carrying a small weight 19. This thread will be free to act as a plumb line when the instrument is turned on edge, as it then is held in a substantially vertical plane by the weight 19.

In operating the device for determining longitude, note down on a sheet of paper or a desirable table, the time of sunrise and the time of sunset and the time zone at which the navigator's watch was set. Rotate the disc 6 carrying the clock dial until the arrow 8 points to the right time zone on the disc 1 and hold firmly in this position. Move the transparent disc 9 up or down and rotate it to the right or left until the arrow marked sunrise points to the time of sunrise and the arrow marked sunset points to the time of sunset on the clock dial. Read the time of mid-day from the arrow 12 marked mid-day on the transparent disc 9 and write it down. Then slide the floating rivet 15 in the zig-zag slot 14 of the transparent pointer 13 until it is opposite the correct month of the year. This will correct for differences in time zones and for differences between mean sun time and observed sun time, and the longitude can then be accurately read at the end of the transparent pointer.

For determining latitude, the following observation should be made at mid-day (as determined in the preceding paragraph). Insert the shadow needle 17 into its socket 16 in the pivot pin 7. Hold the instrument on edge in a north-south plane and with the needle and plumb carrying side toward the east. Rotate the instrument until the plumb line is opposite the correct time of year. The sun will then cast the shadow of the needle on the lower edge of the disc, and the correct latitude is thus read where the shadow crosses the latitude scale.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A navigational device comprising a first disc carrying a pivot pin and having peripheral longitude and time zone scales, a second disc coaxially mounted on said pivot pin adjacent said first disc and having a peripheral 24 hour clock dial arranged adjacent said time zone scale on said first disc and in cooperative reading relationship with respect thereto, a transparent member mounted on said pivot pin adjacent said second mentioned disc, said transparent member having a longitudinal slot therein for pivotal and sliding movement on said pivot pin and provided with noon, sunrise and sunset indices, a pointer oscillatably mounted on said pivot pin adjacent said transparent member to cooperate with said longitude scale, and means movably connecting said pointer to said slot and operable to oscillate said pointer in either direction to adjust said pointer in either direction about its pivot to correct for known differences between mean sun time and observed sun time for different months of the year in order to obtain accurate indications of longitude, and a scale indicating the months of the year, cooperating with said last mentioned means to indicate one factor that determines the relative positioning of said pointer and transparent member.

2. A navigational device providing means for determining position in longitude, comprising a first disc; indicia carried on said disc and representing degrees of longitude and the various time zones; a second disc and a pivot mounting said second disc coaxially and adjacent said first disc, said second disc carrying indicia thereon adjacent said time zone indicia and representing a 24 hour clock dial; a transparent member mounted adjacent said second disc; means including a slot in said member engaging said pivot, thus forming a connection providing pivotal and longitudinal movement of said member relative to said second disc; indicia carried on said transparent member and representing time of sunrise, time of mid-day, and time of sunset; a pointer pivotally mounted adjacent said transparent member, cooperating with the indicia on said discs and having a curved radially extending zig-zag slot, radially spaced indicia adjacent said zig-zag slot denoting the months of the year; and means forming a floating connection passing through both the slot in said transparent member and the zig-zag slot in said pointer, whereby relative movements of said pointer and transparent member are limited and corrections may be made for differences between mean and observed sun time.

3. A navigational device providing means for determining position in longitude, comprising a first disc; indicia carried on said disc and representing degrees of longitude and the various time zones; a second disc and a pivot mounting said second disc coaxially and adjacent said first disc, said second disc carrying indicia thereon adjacent said time zone indicia and representing a 24 hour clock dial; a transparent member mounted adjacent said second disc and having a longitudinal slot therein, engaging said pivot to form a connection providing pivotal and longitudinal movement of said transparent member relative to said second disc; indicia carried on said transparent member and representing time of sunrise, time of mid-day, and time of sunset; and a pointer pivotally mounted adjacent said transparent member, said pointer providing means for correcting differences between mean sun time and observed sun time for any time of year, said time correcting means comprising a generally radial zig-zag slot in said pointer and a pin slidably cooperating with said zig-zag slot and the slot in said transparent member to limit the relative adjustment between said pointer and said member, said zig-zag slot varying a sufficient distance to either side of a central line to deviate the pointer from said central line to compensate for differences between mean and observed sun time.

EDWIN H. WENBERG.

REFERENCES CITED

The following references are of record in the file of this patent:

UNITED STATES PATENTS

| Number | Name | Date |
|---|---|---|
| 624,614 | Bevington | May 9, 1899 |
| 938,780 | McCallister | Nov. 2, 1909 |
| 972,889 | McCallister | Oct. 18, 1910 |
| 1,145,020 | Hill | July 6, 1915 |
| 1,607,560 | Pennino | Nov. 16, 1926 |
| 1,832,342 | Willis | Nov. 17, 1931 |
| 1,919,222 | Jensen et al. | July 25, 1933 |
| 2,311,005 | Thurlow | Feb. 16, 1943 |
| 2,394,226 | Baldocchi | Feb. 5, 1946 |
| 2,432,958 | Wenzel | Dec. 16, 1947 |
| 2,467,360 | Young | Apr. 12, 1949 |